US012695983B2

(12) United States Patent
Angizi et al.

(10) Patent No.: US 12,695,983 B2
(45) Date of Patent: Jul. 28, 2026

(54) NON-VOLATILE PROCESSING-IN-SENSOR ACCELERATOR FOR IMAGING SYSTEMS

(71) Applicants: New Jersey Institute of Technology, Newark, NJ (US); Board of Regents of the University of Nebraska, Lincoln, NE (US)

(72) Inventors: Shaahin Angizi, Newark, NJ (US); Arman Roohi, Lincoln, NE (US)

(73) Assignees: New Jersey Institute of Technology, Newark, NJ (US); NUtech Ventures, Lincoln, NE (US)

( * ) Notice: Subject to any disclaimer, the term of this patent is extended or adjusted under 35 U.S.C. 154(b) by 257 days.

(21) Appl. No.: 18/439,267

(22) Filed: Feb. 12, 2024

(65) Prior Publication Data

US 2024/0284042 A1      Aug. 22, 2024

Related U.S. Application Data

(60) Provisional application No. 63/485,380, filed on Feb. 16, 2023.

(51) Int. Cl.
 H04N 23/65 (2023.01)
 G06V 10/75 (2022.01)
 (Continued)

(52) U.S. Cl.
 CPC ........... H04N 23/651 (2023.01); G06V 10/75 (2022.01); G06V 10/82 (2022.01); G16Y 20/10 (2020.01);
 (Continued)

(58) Field of Classification Search
 CPC .... H04N 23/651; H04N 23/61; H04N 23/667; H04N 25/42; H04N 25/709;
 (Continued)

(56) References Cited

U.S. PATENT DOCUMENTS

| | | | | |
|---|---|---|---|---|
| 12,260,318 | B2 * | 3/2025 | Chang | ................... G11C 17/06 |
| 2016/0342891 | A1 * | 11/2016 | Ross | ..................... G06N 3/063 |
| 2021/0264973 | A1 * | 8/2021 | Jaiswal | ............. G11C 13/0004 |

OTHER PUBLICATIONS

T. Yamazaki, H. Katayama, S. Uehara, A. Nose, M. Kobayashi, S. Shida, M. Odahara, K. Takamiya, Y. Hisamatsu, S. Matsumoto, L. Miyashita, Y. Watanabe, T. Izawa, Y. Muramatsu, and M. Ishikawa, "4.9 a 1ms high-speed vision chip with 3d-stacked 140gops column-parallel pes for spatio-temporal image processing," in 2017 IEEE International Solid-State Circuits Conference (ISSCC). IEEE, Feb. 2017, pp. 82-83.

(Continued)

*Primary Examiner* — Adil Ocak
(74) *Attorney, Agent, or Firm* — Lerner David LLP

(57) ABSTRACT

Disclosed is a Processing-In-Sensor Accelerator (PISA) that provides a flexible, energy-efficient, and high-performance solution for real-time and smart image processing in AI devices. PISA implements a coarse-grained convolution operation in Binarized-Weight Neural Networks (BWNNs) leveraging a novel compute-pixel with non-volatile weight storage at the sensor side. This reduces power consumption of data conversion and transmission to an off-chip processor. A bit-wise near-sensor in-memory computing unit processes the remaining network layers. Once the object is detected, PISA switches to typical sensing mode to capture the image for a fine-grained convolution using only a near-sensor processing unit. The circuit-to-application co-simulation results on a BWNN acceleration demonstrate minor accuracy degradation on various image datasets in coarse-grained evaluation compared to baseline BWNN models. PISA achieves a frame rate of 1000 and efficiency of 1.74 TOp/s/W. PISA reduces data conversion and transmission energy by at least 84% compared to a baseline.

19 Claims, 9 Drawing Sheets

An example of fully-connected network with v output.

(51) Int. Cl.

| | |
|---|---|
| *G06V 10/82* | (2022.01) |
| *G16Y 20/10* | (2020.01) |
| *G16Y 40/35* | (2020.01) |
| *H04N 23/61* | (2023.01) |
| *H04N 23/667* | (2023.01) |
| *H04N 25/42* | (2023.01) |
| *H04N 25/709* | (2023.01) |

(52) U.S. Cl.
CPC ............. *G16Y 40/35* (2020.01); *H04N 23/61* (2023.01); *H04N 23/667* (2023.01); *H04N 25/42* (2023.01); *H04N 25/709* (2023.01)

(58) Field of Classification Search
CPC ...... H04N 23/617; G06V 10/75; G06V 10/82; G16Y 20/10; G16Y 40/35
USPC .......................................................... 709/223
See application file for complete search history.

(56) References Cited

OTHER PUBLICATIONS

T.-H. Hsu, Y.-R. Chen, R.-S. Liu, C.-C. Lo, K.-T. Tang, M.-F. Chang, and C.-C. Hsieh, "A 0.5-v real-time computational cmos image sensor with programmable kernel for feature; extraction," IEEE Journal of Solid-State Circuits, vol. 56, No. 5, pp. 1588-1596, May 2021.

P. Bhowmik, M. J. H. Pantho, and C. Bobda, "Event-based re-configurable hierarchical processors for smart image sensors," in 2019 IEEE 30th International Conference on; Application-specific Systems, Architectures and Processors (ASAP), vol. 2160. IEEE, Jul. 2019, pp. 115-122.

P. Bhowmik, M. J. H. Pantho, and C. Bobda, "Visual cortex inspired pixel-level re-configurable processors for smart image sensors," in 2019 56th ACM/IEEE Design Automation Conference (DAC). IEEE, Jun. 2019, pp. 1-2.

H. Xu, Z. Li, N. Lin, Q. Wei, F. Qiao, X. Yin, and H. Yang, "Macsen: A processing-in-sensor architecture integrating mac operations into image sensor for ultra-low-power bnn-based intelligent visual perception," IEEE Transactions on Circuits and Systems II: Express Briefs, vol. 68, No. 2, pp. 627-631, Feb. 2021.

H. Xu, N. Lin, L. Luo, Q. Wei, R. Wang, C. Zhuo, X. Yin, F. Qiao, and H. Yang, "Senputing: An ultra-low-power always-on vision perception chip featuring the deep fusion of sensing and computing," IEEE Transactions on Circuits and Systems I: Regular Papers, Jan. 2022. 12 pgs.

H. Xu, M. Nazhamaiti, Y. Liu, F. Qiao, Q. Wei, X. Liu, and H. Yang, "Utilizing direct photocur-rent computation and 2d kernel scheduling to improve in-sensor-processing efficiency," in 2020 57th ACM/IEEE Design Automation Conference (DAC). IEEE, Jul. 2020, pp. 1-6.

X. Zhong, Q. Yu, A. Bermak, C.-Y. Tsui, and M.-K. Law, "A 2pj/pixel/direction mimo processing based cmos image sensor for omnidirectional local binary pattern extraction and; edge detection," in 2018 IEEE Symposium on VLSI Circuits. IEEE, Jun. 2018, pp. 247-248.

W.-T. Kim, H. Lee, J.-G. Kim, and B.-G. Lee, "An on-chip binary-weight convolution cmos image sensor for neural networks," IEEE Transactions on Industrial Electronics, vol. 68, No. 8, pp. 7567-7576, Aug. 2021.

R. LiKamWa, Y. Hou, J. Gao, M. Polansky, and L. Zhong, "Redeye: analog convnet image sensor architecture for continuous mobile vision," ACM SIGARCH Computer Architecture News, vol. 44, No. 3, pp. 255-266, Jun. 2016.

J. Choi, S. Park, J. Cho, and E. Yoon, "An energy/illumination-adaptive cmos image sensor with reconfigurable modes of operations," IEEE Journal of Solid-State Circuits, vol. 50, No. 6, pp. 1438-1450, Jun. 2015.

T.-H. Hsu, Y.-C. Chiu, W.-C. Wei, Y.-C. Lo, C.-C. Lo, R.-S. Liu, K.-T. Tang, M.-F. Chang, and C.-C. Hsieh, "Ai edge devices using computing-in-memory and processing-in-sensor: from system to device," in 2019 IEEE International Electron Devices Meeting (IEDM). IEEE, Dec. 2019, pp. 22-25.

* cited by examiner

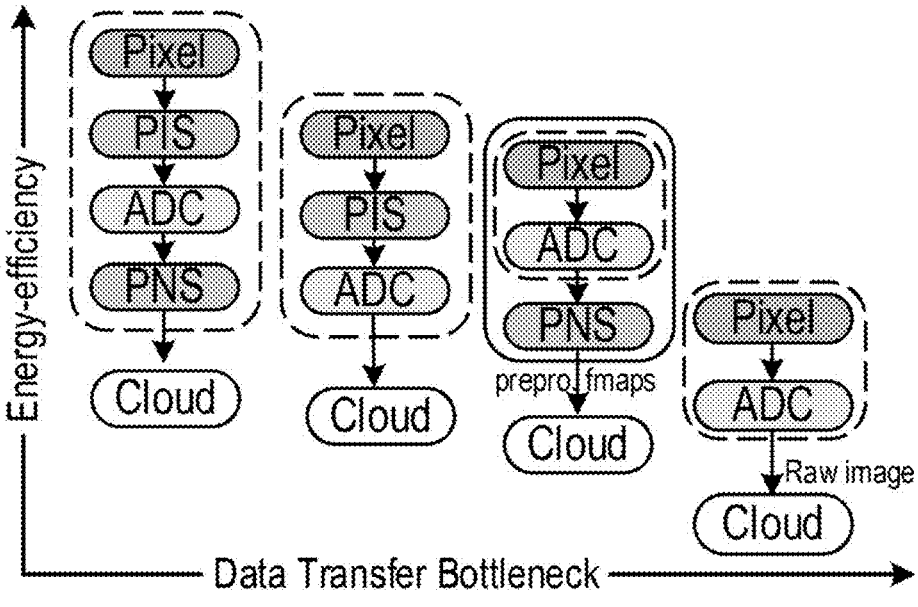
(a)
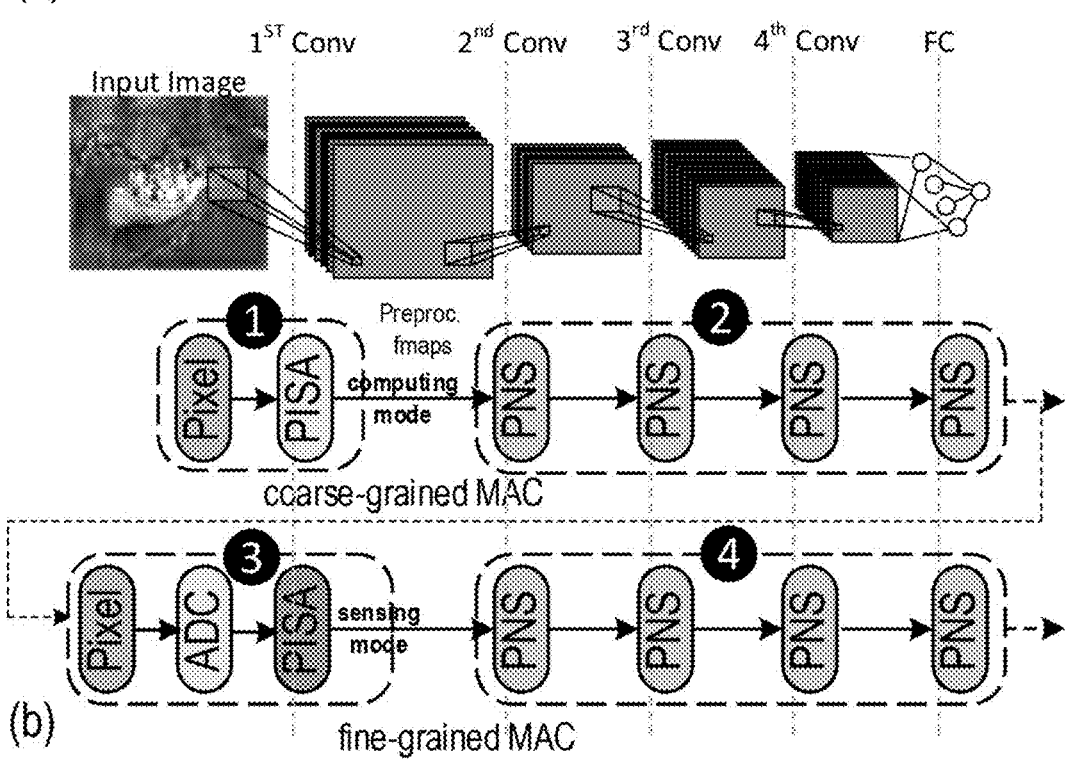
Fig.1(a) Prior Art Various visual system architectures. Fig. 1(b) the proposed hybrid architecture

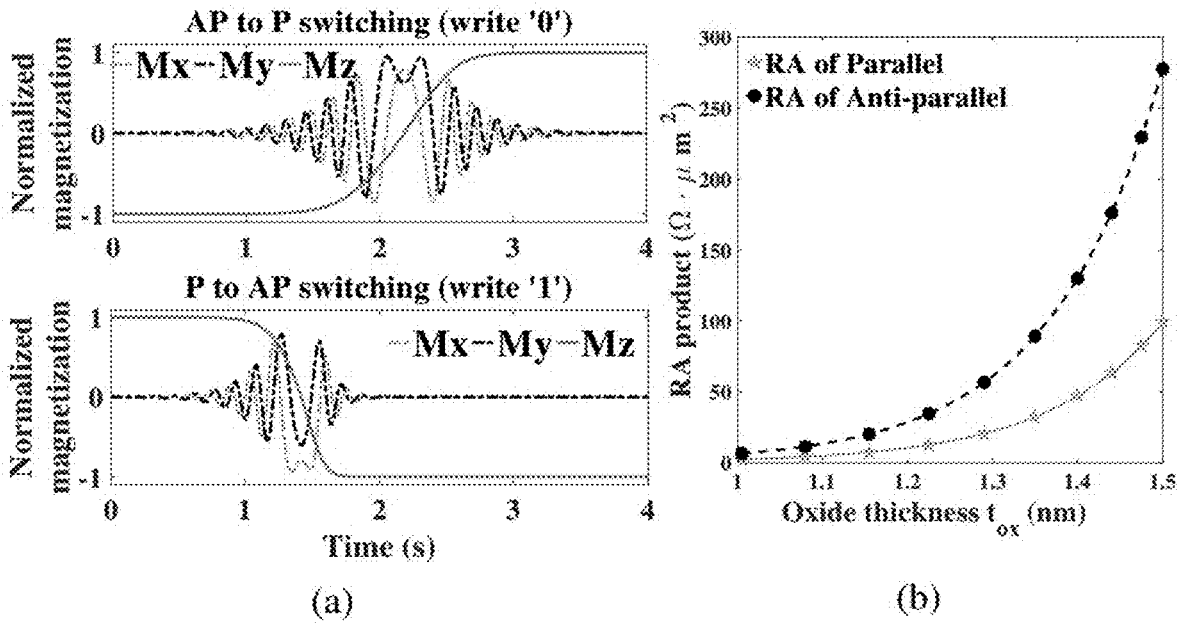
Fig. 2(a) The normalized magnetization switching in x-,y-, and z-axis. Fig. 2(b) The Resistance-Area product w.r.t. the thickness of MTJ tunnel oxide ($t_{ox}$).
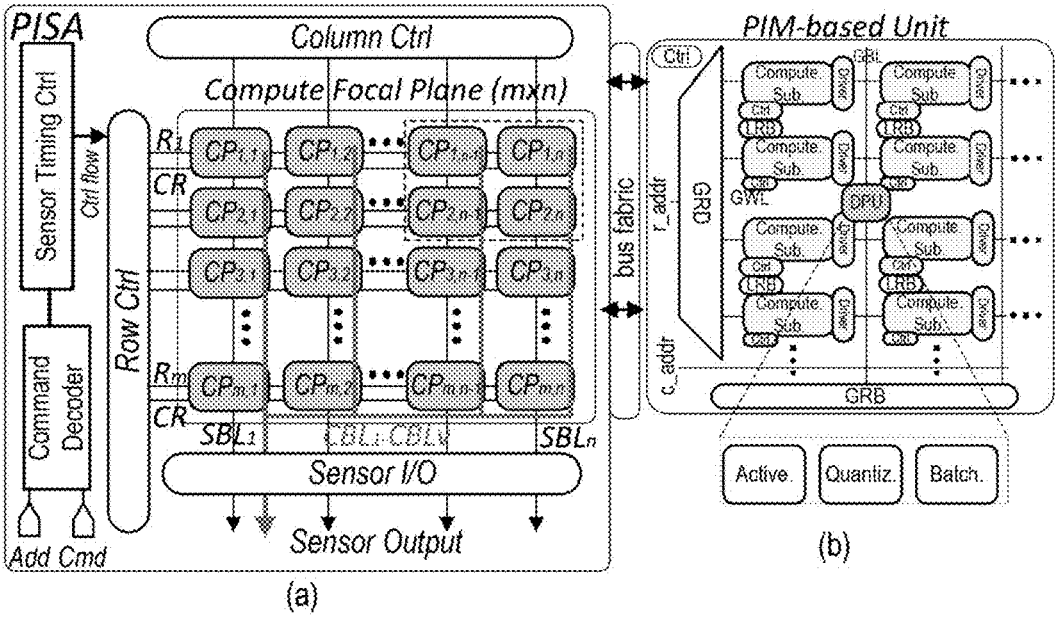
Fig.3 (a) The overview of PISA architecture. Fig. 3(b) PNS architecture

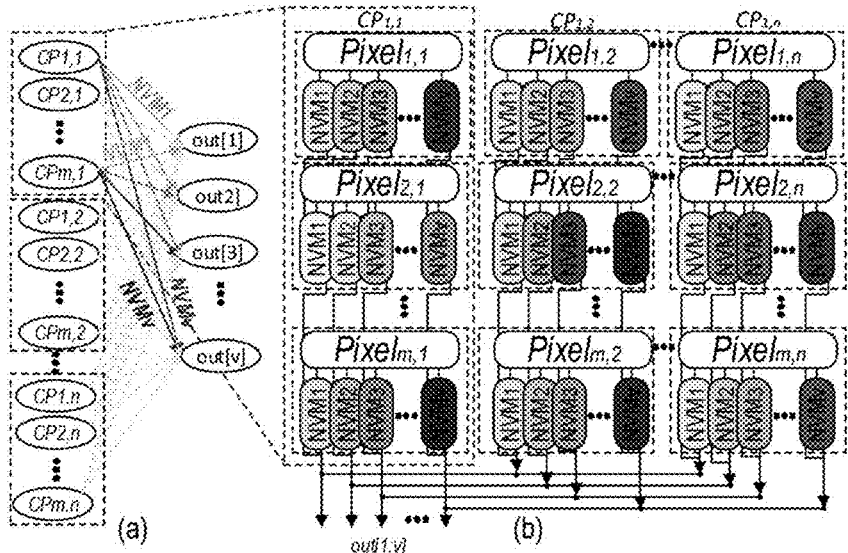
Fig. 4(a) An example of fully-connected network with *v* output. Fig. 4(b) PISA's mapping scheme for an *mxn* CFP.
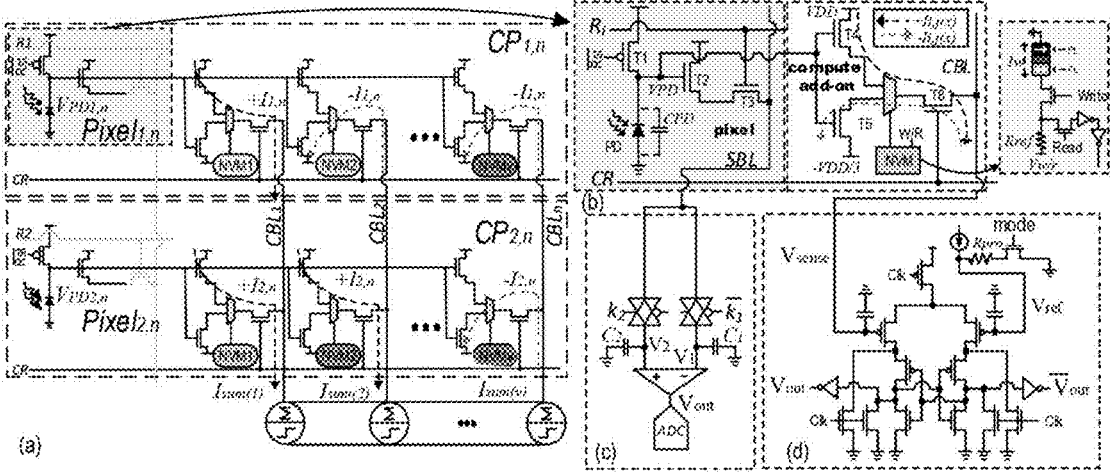
Fig. 5(a) A 2x1 CFP array in processing mode. Fig. 5(b) Compute pixel. Fig. 5(c) CP's read and conversion circuit in sensing mode realizing correlated double sampling procedure. Fig. 5(d) Sense amplifier design in processing mode based in StrongArm latch.

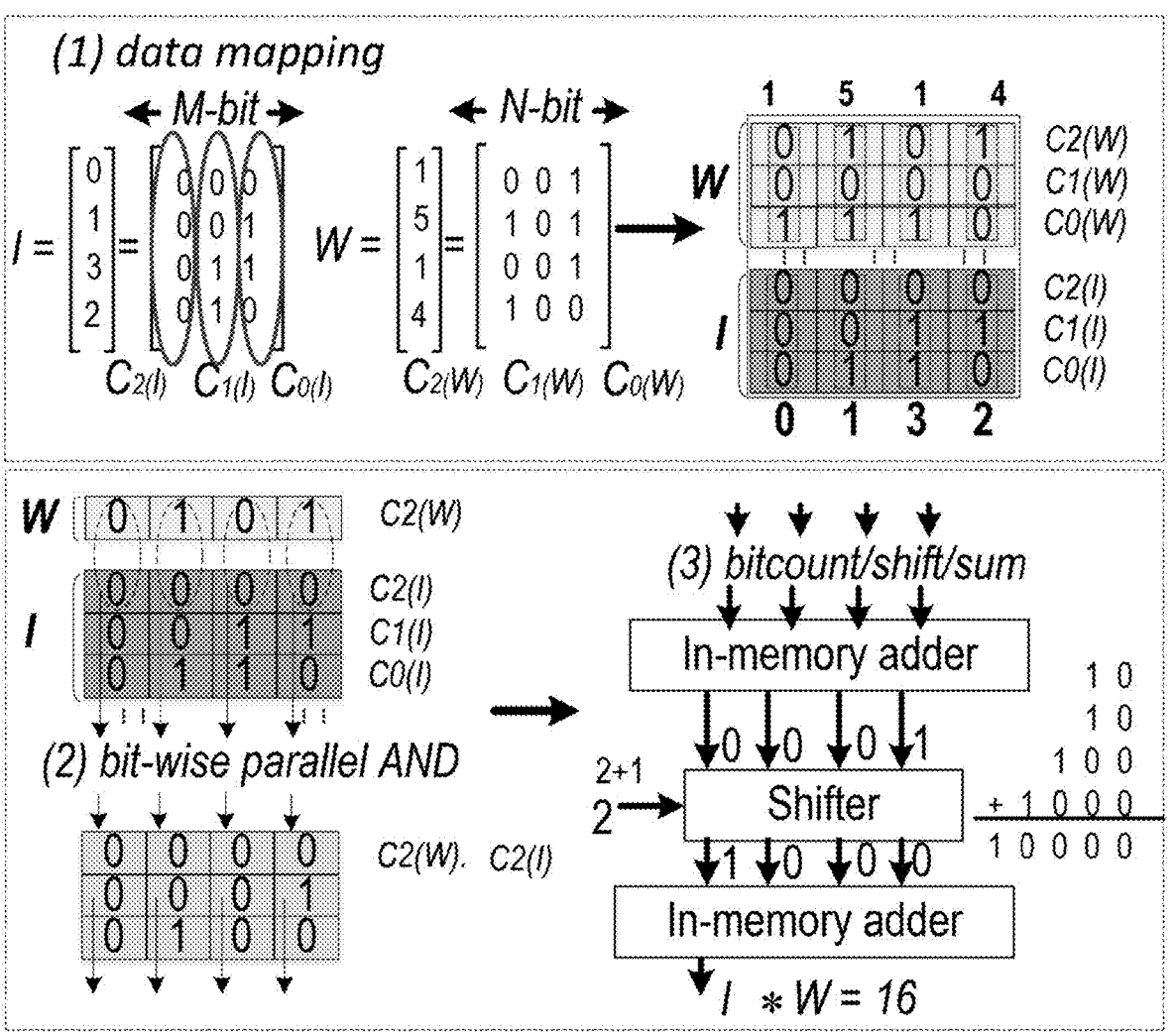
Fig. 6 Acceleration steps of the PNS convolver.

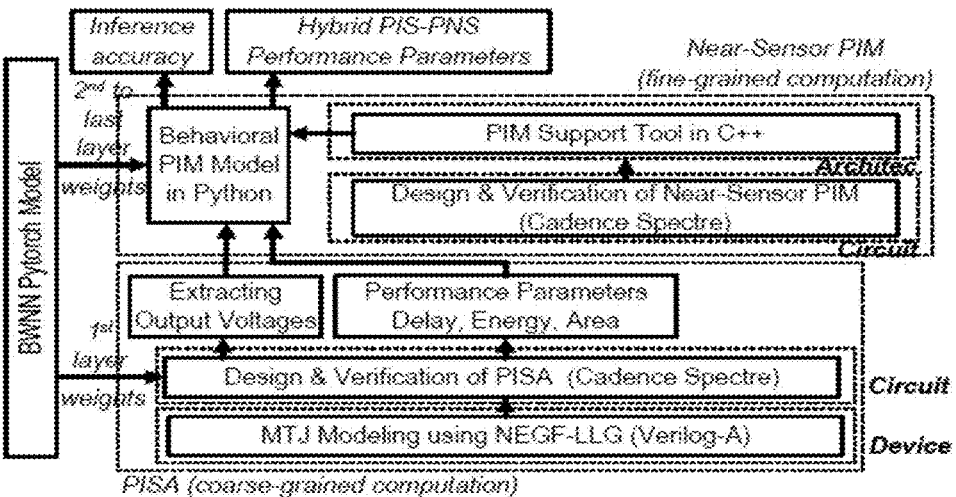
Fig. 7: Evaluation framework.
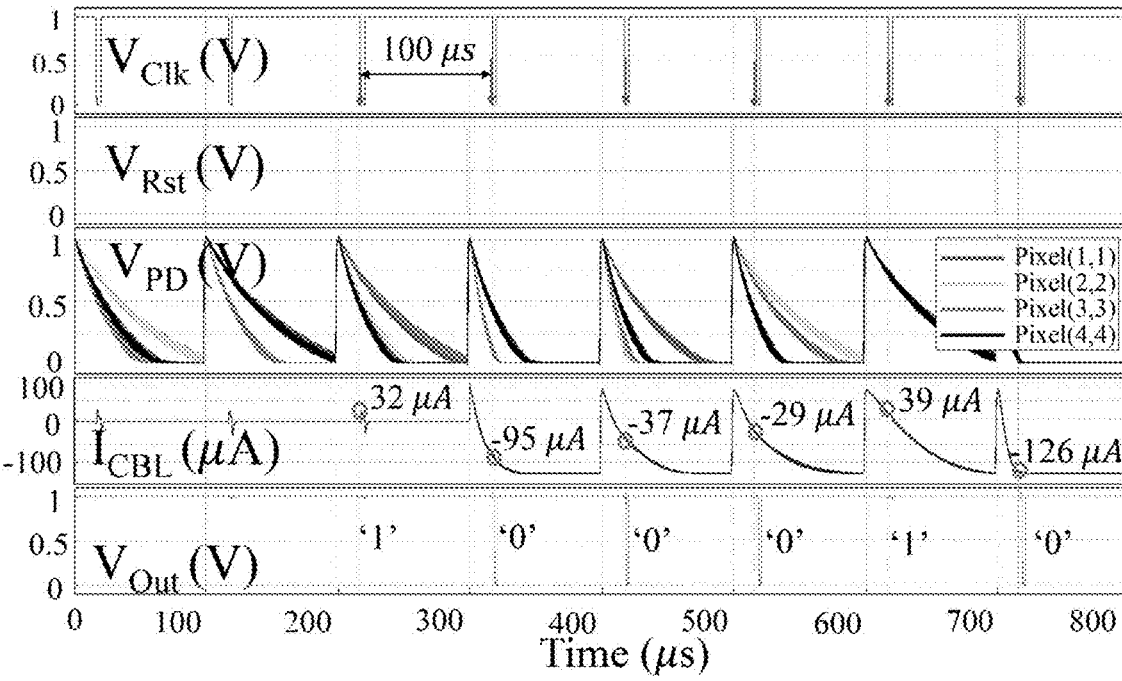
Fig. 8 Post-layout transient simulation result for a sample 4x4 PISA array.

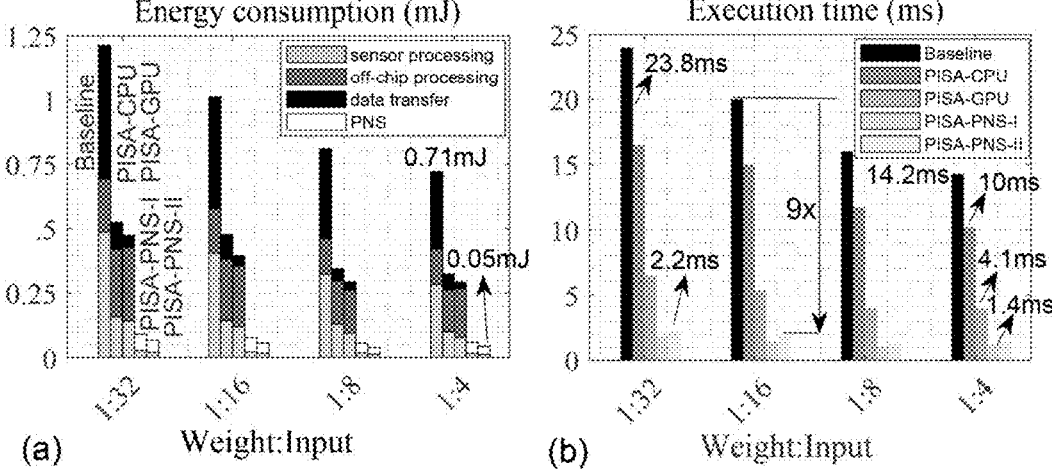
(a)          Weight:Input          (b)          Weight:Input
Fig. 9(a) Energy consumption. Fig. 9(b) Execution time of under-test PISA-based platforms in various PNS configurations compared with the baseline.
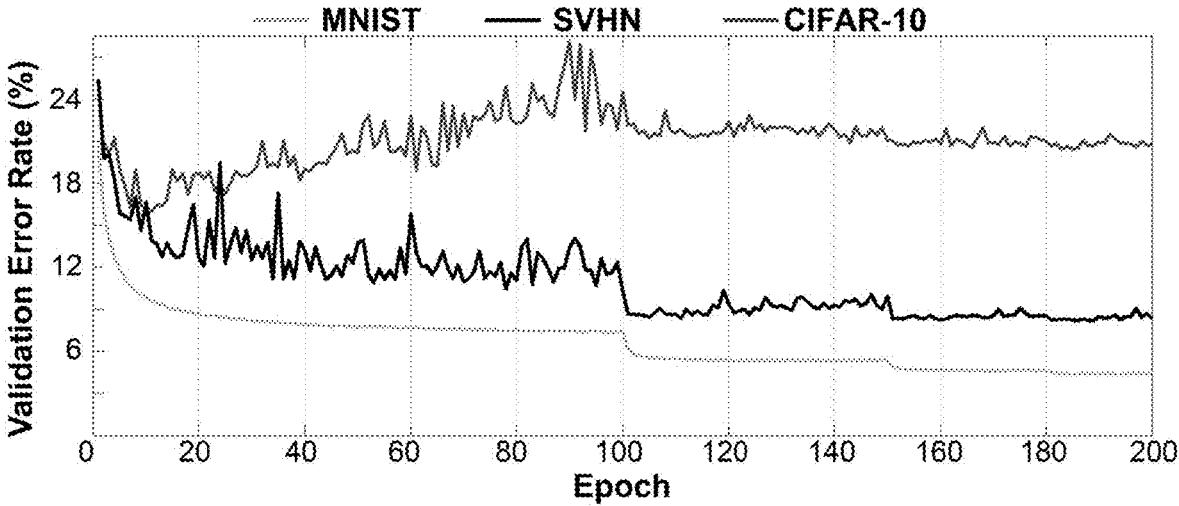
Fig. 10 Validation error curves of three different datasets using the proposed BWNN configuration.

TABLE 1: Simulations Parameters for MTJ.

| Parameter | Value |
|---|---|
| Free layer dimension $(W \times L \times t)_{FL}$ | $65 \times 65 \times 2\ nm^3$ |
| Polarization factor, $P$ | 0.4 |
| Gilbert Damping Factor, $\alpha$ | 0.007 |
| Saturation Magnetization, $M_s$ | $850\ kA/m$ |
| Oxide thickness, $t_{ox}$ | $1.5\ nm$ |
| Resistance-Area product, $RA_p$ / $TMR$ | $10.58\ \Omega \cdot \mu m^2$ / $171.2\%$ |
| Supply voltage | $1\ V$ |
| STT-MRAM cell area | $48F^2$ |
| Access transistor width | $9F$ |
| Cell aspect Ratio | 1.34 |

Fig. 11

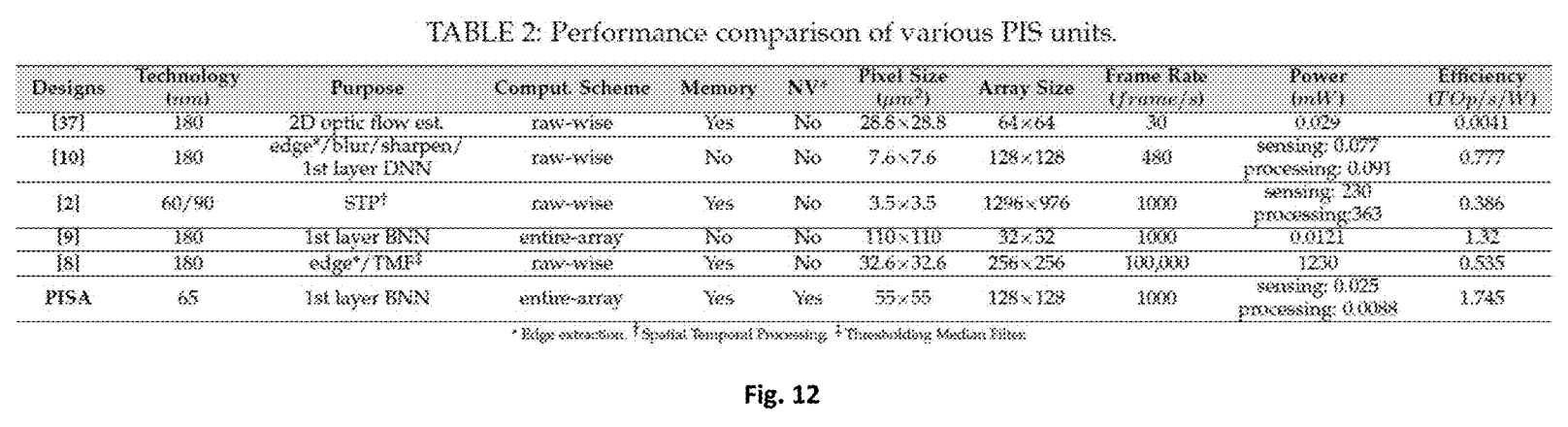

TABLE 2: Performance comparison of various PIS units.

| Designs | Technology (nm) | Purpose | Comput Scheme | Memory | NV* | Pixel Size (µm²) | Array Size | Frame Rate (frames/s) | Power (mW) | Efficiency (TOp/s/W) |
|---|---|---|---|---|---|---|---|---|---|---|
| [37] | 180 | 2D optic flow est. | row-wise | Yes | No | 28.8×28.8 | 64×64 | 30 | 0.029 | 0.0041 |
| [10] | 180 | edge/blur/sharpen/ 1st layer DNN | row-wise | No | No | 7.6×7.6 | 128×128 | 480 | sensing 0.077 processing 0.091 | 0.777 |
| [2] | 60/90 | STP† | row-wise | Yes | No | 3.5×3.5 | 1296×976 | 1000 | sensing 280 processing 363 | 0.386 |
| [9] | 180 | 1st layer BNN | entire-array | No | No | 110×110 | 32×32 | 1000 | 0.0121 | 1.32 |
| [8] | 180 | edge*/TMF‡ | row-wise | Yes | No | 32.6×32.6 | 256×256 | 100,000 | 1230 | 0.535 |
| PISA | 65 | 1st layer BNN | entire-array | Yes | Yes | 55×55 | 128×128 | 1000 | sensing 0.025 processing 0.0088 | 1.745 |

* Edge extraction. † Spatial Temporal Processing. ‡ Thresholding Median Filter.

Fig. 12

TABLE 3: BNN accuracy (%) on MNIST, SVHN and CIFAR-10.

| Configuration | MNIST | SVHN | CIFAR-10 |
|---|---|---|---|
| [31] | 96.0 | 97.47 | 89.85 |
| [40] | 98.25 | 97.00 | 86.98 |
| [41] | 98.4 | 94.9 | 80.1 |
| [33] | – | 96.9 | 88.61 |
| Ours | 95.12 | 90.35 | 79.80 |

Fig. 13

NON-VOLATILE PROCESSING-IN-SENSOR ACCELERATOR FOR IMAGING SYSTEMS

CROSS-REFERENCE TO RELATED APPLICATIONS

The present application claims the benefit of the filing date of U.S. Provisional Application No. 63/485,380 filed Feb. 16, 2023, the disclosure of which is hereby incorporated herein by reference.

GOVERNMENT STATEMENT

This invention was made with government support under contract grant numbers 2216772 and 2216773, titled "Collaborative Research: Integrated Sensing and Normally off Computing for Edge Imaging Systems," and awarded by the National Science Foundation (NSF). The government has certain rights in the invention.

FIELD OF USE

The present disclosure relates to a Processing-in-Sensor architecture based on a set of innovative microarchitectural and circuit-level schemes optimized to process a 1st-layer of Binarized-Weight Neural Networks (BWNN) with weights stored in non-volatile magnetic memory components for offering energy-efficiency and speed-up. The architecture design has a bit-wise near-sensor processing-in-memory-enabled unit to process the remaining network layers.

BACKGROUND OF THE INVENTION

The Internet of Things (IoT) is a network of physical devices or objects ("things") monitored and/or controlled by distributed sensors, controllers, processors, and storage devices interconnected by the Internet. The physical devices or objects may include, for example: materials, objects, persons, areas, terrestrial or air-borne vehicles, appliances, manufacturing or process tools, environments, pipelines, power generation and/or delivery systems, telecommunications equipment, processors and/or storage devices, or other devices or objects for which collected information and/or automated control is important for considerations such as safety, personal health or well-being, security, operational efficiency, information exchange, data processing and data storage.

The importance and magnitude of the IoT cannot be overstated. It has been estimated that the number of devices connected to the IoT will exceed 20 Billion or more by 2020. The total annual revenues for vendors of hardware, software and IoT solutions has been estimated to exceed $470B by 2020 (See, for example, Louis Columbus. "Roundup of Internet of Things Forecasts and Market Estimates." Forbes. Nov. 27, 2016.)

Efficient management and control of such massive networks is of critical importance. A critical concern is the management of the massive amounts of data collected from billions of sensors implemented throughout the IoT. Modern technology is being employed to amass this data in distributed computer and data storage systems including "cloud" based systems. The massive databases being assembled are often referred to "Big Data." Big data has been defined as voluminous and complex data sets. Often traditional data-processing application software is inadequate to deal with Big Data. Challenges include capturing data, data storage, data analysis, search, sharing, transfer, visualization, querying, updating, information privacy, and data source access. Managing and making efficient use of such Big Data is a challenge to system designers.

In recent times, systematic integration of computing and sensor arrays has been widely studied to eliminate off-chip data transmission and reduce Analog-to-Digital Converters (ADC) bandwidth by combining CMOS image sensor and processors in one chip as known as Processing-Near-Sensor (PNS) [1-5], or even integrating pixels and computation unit so-called Processing-In-Sensor (PIS) [7-10,14]. However, since enhancing the throughput is followed by a growth in the temperature and noises that lead to accuracy degradation [6], the computational capabilities of PNS/PIS platforms have been limited to less complex applications. This includes particular feature extraction tasks, for example, Haar-like image filtering [83], blurring [8], and local binary pattern [11]. In a study by Kim et al. [12], a CMOS image sensor with dual-mode delta-sigma ADCs is designed to process the 1st-convolutional layer of Binarized-Weight Neural Networks (BWNN). RedEye executes the convolution operation using charge-sharing tunable capacitors. Although this design shows energy reduction compared to a CPU/GPU by sacrificing accuracy, to achieve high-accuracy computation, the required energy per frame increases dramatically by 100×.

In another study by Macsen [6], a PIS platform processes the 1st-convolutional layer of BWNNs with the correlated double sampling procedure achieving 1000 fps speed in computation mode. However, it suffers from significant area-overhead and power consumption mainly due to the SRAM-based PIS method.

Therefore, there is a need for an improved imaging system and design that addresses three main bottlenecks in IoT (Internet of Things) imaging systems: (1) the conversion, storage, and transfer of the image's pixel values consuming most of the power (>90%) in conventional image sensors; (2) computations imposing high latency and large power consumption; and (3) computations at the edge imposing large area-overhead and power consumption in more recent processing-in-sensor units and requires large memory.

SUMMARY

Compared to the above prior attempts, the present disclosure fulfills the above criteria and provides additional benefits that state-of-the-art systems cannot provide. Unlike prior processing-near-sensor/processing-in-sensor designs that either require modifying sensor structure with a large overhead or waste a lot of energy due to photo-currents conversion and transmission between sensing and computing components. The present design offers: 1) a low-overhead, dual-mode, and reconfigurable design to keep the sensing performance and realize a processing mode to remarkably reduce the power consumption of data conversion and transmission; 2) single-cycle in-sensor processing mechanism to improve image processing speed; 3) highly parallel in-sensor processing design to achieve ultra-high-throughput; 4) exploiting non-volatile magnetic memory which reduces standby power consumption during idle time, and offers instant wake-up time, and resilience to power failure to achieve high performance. The present design is first-of-its-kind for a processing-in-sensor platform consisting of non-volatile magnetic memory.

In one aspect the Processing-In-Sensor Accelerator (PISA) disclosed herein provides a flexible, energy-efficient, and high-performance solution for real-time and smart image processing in AI devices. This design intrinsically implements a coarse-grained convolution operation in Binarized-Weight Neural Networks leveraging a novel compute-pixel with non-volatile weight storage at the sensor side. This remarkably reduces the power consumption of data conversion and transmission to an off-chip processor. The design is completed with a bit-wise near-sensor in-memory computing unit to process the remaining network layers. Once the object is detected, the design switches to typical sensing mode to capture the image for a fine-grained convolution using only a near-sensor processing unit.

In another aspect, the proposed Processing-In-Sensor Accelerator is designed to co-integrate sensing and processing of the 1st-layer of Binarized-Weight Neural Networks (BWNNs) targeting a low power and coarse-grained classification. To enable this, the conventional vision sensor's pixel unit is upgraded to a Compute Pixel (CP). The core part of the proposed accelerator is the CP unit consisting of a pixel connected to n Non-Volatile Memory (NVM) elements. CPs share v Compute Bit-lines (CBL), each connected to a sense amplifier for processing. The 1st-layer binarized weight corresponding to each pixel is pre-stored into the non-volatile magnetic components and an efficient coarse-grained multiply-and-accumulate (MAC) operation is then accomplished in a voltage-controlled crossbar fashion. Accordingly, the output of the first layer is transmitted to a processing-near-sensor unit that enables the computation of the remaining BWNN layers.

This invention can be critical in increasing the battery life of the current IoT devices. This will lead to a new mechanism for designing IoT devices that will have benefits to a variety of critical application domains, including medical monitoring, and industrial and/or environmental sensors, where low-power and fast computation are needed. The broader economic impacts facilitate national leadership in IoT technology at the intersection of nanotechnology, integrated sensing, and battery-free computing.

BRIEF DESCRIPTION OF THE DRAWINGS

To assist those of skill in the art in making and using the disclosed composition and method, reference is made to the accompanying figures, wherein:

FIGS. 1(a)-1(b) show visual system architectures; FIG. 1(a) shows prior art various visual system architectures; and FIG. 1(b) shows a proposed hybrid architecture;

FIGS. 2(a)-2(b) are graphs; FIG. 2(a) shows the normalized magnetization switching in x-, y-, and z-axis; FIG. 2(b) shows the Resistance-Area product w.r.t the thickness of MTJ tunnel oxide $(t_{ox})$;

FIG. 3 (a) illustrates an overview of the PISA (Processing-In-Sensor Accelerator) architecture; FIG. 3(b) illustrates a PNS architecture;

FIG. 4(a) illustrates an example of a fully connected network with v output;

FIG. 4(b) shows PISA's mapping scheme for an m×n CFP;

FIG. 5(a) illustrates a 2×1 CFP array in processing mode; FIG. 5(b) illustrates a Compute pixel; FIG. 5(c) illustrates a CP's read and conversion circuit in sensing mode realizing correlated double sampling procedure; and FIG. 5(d) illustrates a Sense amplifier design in processing mode based on StrongArm latch;

FIG. 6 illustrates The acceleration steps of the PNS convolver;

FIG. 7 illustrates an Evaluation framework;

FIG. 8 illustrates a Post-layout transient simulation result for a sample 4×4 PISA array;

FIG. 9(a) illustrates Energy consumption; FIG. 9(b) shows the Execution time of under-test PISA-based platforms in various PNS configurations compared with the baseline;

FIG. 10 shows the Validation error curves of three different datasets using the proposed BWNN configuration;

FIG. 11 show a table illustrating simulations parameters for MTJ;

FIG. 12 is a table illustrating performance comparison of various PIS units; and FIG. 13 is a table illustrating BNN accuracy (%) on MNST, SVHN and CIFAR.

DETAILED DESCRIPTION

Despite the sheer size of the Internet of Things (IoT)—a projected $1100B market by 2025—severe challenges remain to realizing IoT potential in current edge imaging systems widely used in smartphones, autonomous vehicles, and camera-based medical instruments: (1) The conversion, storage, and transfer of the image's pixel values consume most of the power (>90%) in conventional image sensors; (2) the computation at the cloud imposes or could impose high latency and consumes large power; and (3) the computation at the edge imposes a large area-overhead and power consumption in most recent processing-in-sensor units and requires large memory.

The present design enables a smooth transition from the current cloud-centric IoT approach to a data-centric approach, whereby the mobile edge devices can opportunistically perform computation at the sensor by repurposing the sensor's pixels to a generic data-parallel processing unit. This paradigm (1) significantly reduces the power consumption of converting photocurrents into pixel values used for image processing, thus remarkably reducing data storage and data transmission to a back-end processor; (2) accelerates data processing and computation at the edge allowing simultaneous sensing and computing and alleviates the memory bottleneck problem; and (3) imposes a small area-overhead and considerably lower power due to leveraging non-volatile magnetic memories rather than SRAM at the edge. Moreover, the present design systematically enables deploying new foundational low-bit-width neural network algorithms into resource-constrained edge devices.

A processing-in-sensor accelerator is proposed, as a flexible, energy-efficient, and high-performance solution for real-time and smart image processing in AI devices. This design intrinsically implements a coarse-grained convolution operation in Binarized-Weight Neural Networks leveraging a novel compute-pixel with non-volatile weight storage at the sensor side. This remarkably reduces the power consumption of data conversion and transmission to an off-chip processor. The design is completed with a bit-wise near-sensor in-memory computing unit to process the remaining network layers. Once the object is detected, the accelerator switches to typical sensing mode to capture the image for a fine-grained convolution using only a near-sensor processing unit. This invention can be critical in increasing the battery life of the current IoT devices. This will lead to a new mechanism for designing IoT devices that will have benefits to a variety of critical application domains, including medical monitoring, and industrial and/or environmental sensors, where low-power and fast computation are needed.

1. CHALLENGES FOR IOT SENSORY SYSTEMS

Internet of Thing (IoT) devices are projected to attain an $1100B market by 2025, with a web of interconnection projected to comprise approximately 75+ billion IoT devices, including wearable devices, smart cities, and smart industry [1'], [2']. Intelligent IoT (IIoT) nodes consist of sensory systems, which enable massive data collection from the environment and people to process with on-/offchip processors (1018 bytes/s or ops). In most cases, large portions of the captured sensory data are redundant and unstructured. Data conversion and transmission of large raw data to a back-end processor impose high energy consumption, high latency, a memory bottleneck, and low-speed feature extraction on the edge [1'] as shown with the pixel-only architecture in FIG. 1 (*a*).

To overcome these issues, computing architectures will need to shift from a cloud-centric approach to a thing-centric (data-centric) approach, where the IoT node processes the sensed data. Nonetheless, the processing demands of artificial intelligence tasks such as Convolutional Neural Networks (CNNs) spanning hundreds of layers face serious challenges for their tractability in computational and storage resources. Effective techniques in both software and hardware domains have been developed to improve CNN efficiency by alleviating the "power and memory wall" bottleneck. In algorithm-based approaches, the use of shallower but wider CNN models, quantizing parameters, and network binarization has been explored thoroughly [3'], [4'].

Recently, low bit-width weights and activations have reduced computing complexity and model size. For instance, in S. Zhou et al [3'], investigators performed bit-wise convolution between the inputs and low bit-width weights by converting the conventional Multiplication-And-Accumulate (MAC) into the corresponding AND-bit count operations. In an extreme quantization method, binary convolutional neural networks have achieved acceptable accuracy on both small [5'] and large datasets [4'] by relaxing the demands for some high-precision calculations. Instead, they binarize weight and/or input feature map while processing the forward path, providing a promising solution to mitigate the aforementioned bottlenecks in storage and computational components [6'].

From the hardware point of view, the underlying operations should be realized using efficient mechanisms. However, the conventional processing elements are developed based on the von-Neumann computing model with separate memory and processing blocks connecting via buses, which imposes serious challenges, such as long memory access latency, limited memory bandwidth, energy-hungry data transfer, and high leakage power consumption restricting the edge device's efficiency and working hours [2'], [7']. Besides, in the upper level, this causes several significant issues such as communication bandwidth and security. Therefore, as a potential remedy, smart image sensors with instant image preprocessing have been extensively explored for object recognition applications [2'], [8']-[10']. This paves the way for new sensor paradigms such as a Processing-Near-Sensor (PNS), in which digital outputs of a pixel are accelerated near the sensor leveraging an on-chip processor.

Another solution to alleviate the above-mentioned challenges is a Processing-in-Memory (PIM) architecture, which is extensively studied in [6'], [7'], [11'], [12']. By inspiring the PNS and PIM techniques, two promising alternatives are the Processing-in-Sensor (PIS) that works on pre-Analog-to-Digital Converters (ADC) data [9'], [13'] and a hybrid PISPNS platform [1'] to improve vision sensor functionality and eliminate redundant data output, as shown in FIG. 1(*a*).

However, the computational capabilities of these sensors have been limited to specific applications. This includes specific feature extraction applications less supporting MACbased image classification [1'], [8'] to meet both resiliency and efficiency such as Haar-like image filtering [14'], sharpening, blurring [10'], and local binary pattern [15']. In general, the PIS units are designed to process the image before transmitting the raw data to the on-chip memory unit to be processed by a PNS (PIM) unit. Such data transfer in traditional designs (from CMOS image sensors to the memory) imposes a serious bottleneck and reduces the feature extraction speed remarkably. Therefore, having a coarse grained computation with a PIS unit can (i) reduce the power consumption of data conversion from photocurrents to pixel values in the image processing tasks, (ii) increase the data processing speed, and (iii) alleviate the memory bottleneck issue [1'], [2'].

1.1 Processing-In-Sensor Accelerator (PISA)

A new Processing-In-Sensor Accelerator (PISA) was developed by the present investigators. The PISA of the present disclosure has an energy-efficient PIS paradigm cointegrating always-on sensing and processing capabilities working with a near-sensor PIM unit (PNS) that is categorized as a new hybrid design as shown in FIG. 1(*b*). The new design features a real-time programmable coarse-grained convolution to reduce the power consumption of data conversion from photocurrents to pixel values in the image processing task. Once the object is detected, PISA switches to a typical sensing mode to capture the image for fine-grained convolution using a PNS unit. The contributions of this new PISA, include but are not limited to 1) a PIS architecture based on a set of innovative microarchitectural and circuit-level schemes optimized to process the 1st-layer of Binarized-Weight Neural Networks (BWNN) with weights stored in non-volatile memory components that offers energy-efficiency and speed-up; 2) a design with a bit-wise near-sensor PIM-enabled unit to process the remaining network layers. The presented bulk bit-wise computation operations are supported by most PIM architectures; 3) a solid bottom-up evaluation framework and a PIM assessment simulator to analyze the performance of the whole system; and PISA's performance and energy-efficiency co-integrated with the PNS unit compared with recent sensory platforms.

2. PISA BACKGROUND AND MOTIVATION

2.1 Near-Sensor & In-Sensor Processing

Systematic integration of computing and sensor arrays has been widely studied to eliminate off-chip data transmission and reduce ADC bandwidth by combining CMOS image sensor and processors in one chip as known as PNS [2'], [10'], or even integrating pixels and computation unit so-called PIS [9'], [13'], [16']. In [10'], photocurrents are transformed into pulse-width modulation signals and a dedicated analog processor is designed to execute feature extraction reducing ADC power consumption. In [2], 3D-stacked column-parallel ADCs and Processing Elements (PE) are implemented to run spatiotemporal image processing. In [17'], a CMOS image sensor with dual-mode delta-sigma ADCs is designed to process the 1st-conv, layer of BWNNs. RedEye [18'] executes the convolution operation using charge-sharing tunable capacitors. Although this design shows energy reduction compared to a CPU/GPU by sacrificing accuracy, to achieve high-accuracy computation, the required energy per frame increases dramatically by 100×. MACSEN [9'] as a PIS platform processes the 1st-convolutional layer of BWNNs with the correlated double sampling procedure achieving 1000 fps speed in computation mode. However, it suffers from humongous area overhead and power consumption mainly due to the SRAM-based PIS method.

In a previous study [19'], a pulse-domain algorithm uses fundamental building blocks, photodiode arrays, and an ADC to perform near-sensor image processing that reduces design complexity and enhances both cost and speed. There are three main bottlenecks in IoT imaging systems that this work explores and aims to solve:

(1) The conversion and storage of pixel values consume most of the power (>96% [9']) in conventional image sensors;

(2) the computation imposes a large area-overhead and power consumption in more recent PNS/PIS units and requires extra memory for intermediate data storage; and (3) the system is hardwired so the functionality is limited to simple preprocessing tasks such as 1st-layer BWNN computation and cannot go beyond that point.

2.2 MRAM as a High-Performance Non-Volatile Memory

With the great advancement of fabrication technology and commercialization of MRAM (e.g., IBM [20'] and Everspin [21']), it is becoming a next-generation universal Non-Volatile Memory (NVM) technology, with potential applications in both last-level cache and main memory [22']. Particularly, recent current-induced Spin-Transfer Torque (STT) and Spin-Orbit Torque (SOT)-based MRAMs have greatly changed the state-of-the-art memory hierarchy due to their non-volatility, zero leakage power in un-accessed bit-cell [23'], high integration density (2× more than SRAM), high speed (sub-nanosecond) [24'], excellent endurance (about 1015 cycles [25']), and compatibility with the CMOS fabrication process (back end of the line) [23']. A standard 1-transistor 1-resistor (1T1R) STT-MRAM bit-cell consists of an access transistor and a Magnetic Tunnel Junction (MTJ). A typical MTJ structure consists of two ferromagnetic layers with a tunnel barrier sandwiched between them [26'].

One of the layers is a pinned magnetic layer, while the other one is a free magnetic layer. Due to the tunneling magnetoresistance (TMR) effect [26'], the resistance of MTJ is high or low when the magnetization of two ferromagnetic layers is antiparallel or parallel. The free layer magnetization could be manipulated by applying a current-induced STT [27'].

For the STT-MRAM modeling in this work, the Non-Equilibrium Green's Function (NEGF) and Landau-Lifshitz-Gilbert (LLG) equation are used before the circuit-level simulation.

The magnetization dynamics of MTJ's Free Layer-FL (m) can be modeled as [28']:

$$\frac{dm}{dt} = -|\gamma|m \times H_{eff} + \alpha\left(m \times \frac{dm}{dt}\right) + |\gamma|\beta(m \times m_P \times m) - |\gamma|\beta\epsilon'(m \times m_P) \quad (1)$$

$$\beta = \left|\frac{\hbar}{2\mu_0 e}\right|\left|\frac{I_c P}{A_{MTJ}t_{FL}M_s}\right| \quad (2)$$

where h is the reduced plank constant, theta is the gyromagnetic ratio, Ic is the charge current flowing through MTJ, tFL is the thickness of the free layer, epsilon is the second Spin transfer torque coefficient, and Heff is the effective magnetic field. P is the effective polarization factor, AMTJ is the cross-sectional area of MTJ, and mp is the unit polarization direction.

FIG. 2(a) shows the normalized magnetization dynamics of the free layer in x, y, and z-axes when performing the STTMRAM write scheme. Based on the simulation parameters listed in Table 1 in FIG. 11, the magnetization dynamic from the LLG equation can provide the relative angle θ between the magnetization of Pinned Layer-PL (^z) and Free Layer-FL (m).

Therefore, the real-time conductance of MTJ (GMTJ) is given by:

$$G_{MTJ} = \frac{G_P + G_{AP}}{2} + \frac{G_P - G_{AP}}{2}\cos\theta \quad (3)$$

where GP and GAP are the conductance of MTJ in parallel (θ=0) and anti-parallel (θ=180) configurations. Both GP and GAP are obtained from the atomistic level simulation framework based on Non-Equilibrium Green's Function (NEGF) [29'], while the Resistance-Area Product with respect to the thickness of MTJ tunnel oxide is shown in FIG. 2(b).

3. THE PISA ARCHITECTURE

FIG. 1(b) shows an overview of the proposed and presently disclosed hybrid architecture's data flow regarding a simple network structure with four convolutional layers and one Fully Connected (FC) layer. Similarly, the proposed approach can be extended to accelerate much more complex CNN models. It was first proposed that PISA is a flexible, energy-efficient, and high-performance solution for real-time and smart image processing in AI devices. PISA will integrate sensing and processing phases and can intrinsically implement a coarse grained convolution operation (FIG. 1(b) denoted as step "1") required in a wide variety of image processing tasks such as classification by processing the 1st-layer in BWNNs. The design depending on the implementation may be completed with a PNS unit to perform a low bit-width coarse-grained convolution on the remaining layers. Once the object is roughly detected at the end of step-"2", PISA will switch to the typical sensing mode denoted as step "3" to capture the image for a fine-grained convolution using the PNS unit as denoted in step "4".

The following is an overview of one of the embodiments of the present invention. This example is merely meant to illustrate some of the principles of the invention and in no way limit the invention to just this embodiment. At a high level, the PISA array consists of an m×n Compute Focal Plane (CFP), row and column controllers (Ctrl), command decoder, sensor timing ctrl, and sensor I/O operating in two modes, for example, sensing and processing as shown in FIG. 3(a).

The CFP is designed to cointegrate sensing and processing of the 1st-layer of BWNN targeting a low-power and coarse-grained classification. To enable this process, the conventional pixel unit is upgraded to a Compute Pixel (CP). The Ri (Row) signal is controlled by the Row Ctrl and shared across pixels located in the same row to enable access during the row-wise sensing mode. However, the CR (ComputeRow) is a unique controlling signal connected to entire CP units activated during processing mode. The core part of PISA is the CP unit consisting of a pixel connected to v Non-Volatile Memory (NVM) elements as shown in FIG. 4. A Sense Bit-line (SBL) is shared across the pixels on the same column connected to sensor I/O for sensing mode (FIG. 3(a)). Moreover, CPs share v Compute Bit-lines (CBL), each connected to a sense amplifier for processing as indicated by the purple line in FIG. 3(*a*). The 1st-layer binarized weight corresponding to each pixel is pre-stored into NVMs and an efficient coarse-grained MAC operation is then accomplished in a voltage-controlled crossbar fashion. Accordingly, the output of the first layer, as shown in FIG. 1(*b*), is transmitted to a PNS unit that enables the computation of the remaining BWNN layers.

FIG. 4(*a*) depicts a sample neural network, wherein $CP_{1,1}$-$CP_{m,n}$ are linked to out1 via $NVM_1$'s weight. Similarly, every pixel is connected to out2-outv. To maximize MAC computation throughput and fully leverage PISA's parallelism. It is proposed that a hardware mapping scheme and connection configuration between CP elements and corresponding NVM add-ons shown in FIG. 4(*b*) to implement the target neural network.

3.1 Compute-Pixel Element

The CP is composed of a pixel (three transistors and one Photodiode (PD)) as shown in FIG. 5, and v compute addons. The compute add-on consists of three transistors of which T4 and T5 work as deep triode region current sources and a 2:1 MUX controlled by an NVM element. It was selected a STT-MRAM as the NVM unit as depicted in FIG. 5(*b*) due to its high speed (sub-nanosecond), long endurance (10 years), and less than fJ=bit memory write energy (close to SRAM) [28']. Thus, the binary weight data is stored as the magnetization direction in the MTJ's free layer, which could be programmed through the current-induced STT by the NVM write driver. A reference resistor is then used to realize a voltage divider circuit to read out the weight value from the memory.

FIG. 5(*a*) illustrates a 2×1 CP array implementation. It is noted that the number of compute add-ons in each CP is kept to a maximum of 64 according to simulations to keep the pixel sensitivity high.

3.2 Sensing Mode

In sensing mode, by initially setting Rst='high', the photodiode (PD) connected to the T1 transistor (see FIG. 5(*b*)) turns into inverse polarization. In this way, turning on the access transistor T3 and k1 switch (see FIG. 5(*c*)) at the Sensor I/O allows the C1 capacitor to fully charge through SBL. By turning off T1, PD generates a photo-current with respect to the external light intensity which in turn leads to a voltage drop (VPD) at the gate of T2. Once again by turning on the T3 and this time k2 switch, C2 is selected to record the voltage drop. Therefore, the voltage values before and after the image light exposure, i.e., V1 and V2, are sampled by the CP, and the difference between the two voltages is sensed with an amplifier.

This value is proportional to the voltage drop on VPD. In other words, the voltage at the cathode of PD can be read at the pixel output. It is worth pointing out that each ADC samples when the voltage drops, then it subtracts the pixel reset voltage and converts the output signal. Accordingly, the ADC can skip to the next row of the array. Please note that in sensing mode, the CR signal is grounded.

3.3 Integrated Sensing-Processing Mode

In this mode, as shown in a sample 2×1 CFP array in FIG. 5(*a*), the CPD capacitor is initialized to the fully charged state by setting Rst='high', similar to the sensing mode. During an evaluation cycle, by turning off T1, the row ctrl activates the CR signal, while the Ri signals are deactivated. This will activate the entire array for a single-cycle MAC operation. The core idea behind the compute add-on shown in FIG. 5(*b*) is to leverage the pixel's VPD as a sampling voltage for T4(/T5) in v-NVM units to simultaneously generate or pull current from the CBLs. To implement multiplications between the pixel value identified by VPD and the binary weight stored in NVM, a 2:1 MUX unit was devised in every CP taking the T4's source and T5's drain signals as inputs and NVM sensed data as the selector. Note that T4 and T5 are connected to $V_{DD}$ and $-V_{DD}/3$, respectively. After exposure, the set of input sensor voltages $V_{PD}=[V_{PD1,1}, V_{PD1,2}, \ldots, V_{PDm,n}]$ is applied to the gate of T4*s* and T5*s* generating current set I=[$I_{1,1(1)}, I_{1,1(2)}, \ldots, I_{1,1(v)}, \ldots, I_{m,n(1)}, I_{m,n(2)}, \ldots, I_{m,n(v)}$] for the entire array. If the binary weight equals '1' (Wi=+1), T4 acts as a current source and generates a current with $I_{i,j~(x)}$ magnitude on the shared CBL as shown by the red dashed line in FIG. 5(*b*). However, if the binary weight equals '0' (Wi=−1), T5 transistor acts as a negative current source and pulls a current with the same magnitude as $I_{i,j~(x)}$ in the opposite direction from the shared CBL as indicated by the blue dashed line in FIG. 5(*b*). Please note that T4's and T5's gate capacitors as well as parasitic capacitors will be fully charged to $V_{DD}$ through T1 in the pre-charge cycle, this will significantly keep the pixel sensitivity when the number of compute add-ons increases.

This mechanism converts every input pixel value to a weighted current according to the NVM that is interpreted as the multiplication in BWNNs. Mathematically, let Gj,i be the conductance of the synapse connecting ith to the jth node, the current through that synapse is Gj, iVi and the collection of the current through each CBL represents the MAC result ($I_{sum,j}=\Sigma_i G_{j,i}V_i$), according to Kirchhoff's law. This is readily calculated by measuring the voltage across a sensing resistor.

For the activation function, it was designed and tuned a sense circuit connected to each CBL based on StrongARM latch to realize an in-sensor sign function [30'], [31'] as shown in FIG. 5(*d*). The sense amplifier requires two clock phases: pre-charge (Clk 'high') and sensing (Clk 'low'). During sensing, $I_{sum(x)}$ flows from every CBL to the ground and generates a sense voltage (Vsense) at the input of the sense amplifier. This voltage is compared with the reference voltage by applying a proportional current over a processing reference resistor (Rpro) activated by the mode signal. The binary activation is then transmitted through the bus fabrics to the PNS unit for storage.

4 NEAR-SENSOR BIT-WISE PIM UNIT (PNS)

Besides the 1st-layer, there are other convolutional and FC layers in BWNNs that can be accelerated close to the sensor without sending the activated feature maps to off-chip processors. The general memory organization of the PNS unit is shown in FIG. 3(*b*). The memory unit is divided into multiple banks consisting of computational sub-arrays. Every two sub-arrays share a Local Row Buffer (LRB) and the entire array shares a Digital Processing Unit (DPU) to pre-process the data by quantization and post-process outputs with linear batch normalization and activation. For the microarchitecture and circuit-level implementation of the near-sensor PIM unit, we adopt DRISA-ITIC [11'] and ReDRAM [32'] techniques.

FIG. 6 gives an overview of the BWNN bitwise acceleration steps. In the first step, the preprocessed data from PISA is mapped into the computational subarrays. In the second step, parallel computational sub-arrays perform bulk bit-wise operations between tensors and generate the output. Accordingly, the output is activated by DPU's activation unit and saved back into memory. From a computation perspective, every convolutional layer can be similarly implemented by exploiting logic AND, bitcount, and bitshift as rapid and parallelizable operations [3']. Assume I is a sequence of M-bit input integers (3-bit as an example in FIG. 6) located in input fmap covered by the sliding kernel of W, such that Ii € I is an M-bit vector representing a fixed-point integer. Now, indexed is the bits of each Ii element from LSB to MSB with m=[0;M−1], such that m=0 and m=M−1 are corresponding to LSB and MSB, respectively. Accordingly, we represent a second sequence denoted as Cm(I) including the combination of mth bit of all Ii elements (shown by colored elliptic). For instance, C0(I) vector consists of LSBs of all Ii elements "0110". Considering W as a sequence of N-bit weight integers (3-bit, herein) located in a sliding kernel with index of n=[0;N−1]. The second sequence can be similarly generated as Cn(W).

Now, by considering the set of all mth value sequences, the I can be represented like:

$$I = \sum_{m=0}^{M-1} 2^m c_m(I).$$

Likewise, W can be represented like:

$$W = \sum_{n=0}^{N-1} 2^n c_n(W).$$

In this way, the convolution between I and W can be defined as:

$$\sum_{m=0}^{M-1}\sum_{n=0}^{N-1} 2^{m+n} bitcount(and(C_n(W), C_m(I))).$$

As shown in the data mapping step of FIG. 6, C2(W)-C0 (W) are consequently mapped to the designated subarray. C2(I)-C0(I) are mapped in the following memory rows in the same way. Now, the computational sub-array can perform bit-wise parallel AND operation of Cn(W) and Cm(I) as depicted in FIG. 6. The results stored within the sub-array will be accordingly processed using DPU's bit counter. Bit-counter readily counts the number of "1"s in each resultant vector and passes it to the Shifter unit. As depicted in FIG. 6, "0001", as a result of Bit-Counter is left shifted by 3-bit (X $2^{2+1}$) to "1000". Eventually, the PIM adds the shifter unit's outputs to produce output fmaps for every layer. Note that the PNS unit supports multi-bit convolution so the various configurations of weight:input can be achieved at the edge.

5 PERFORMANCE EVALUATION

5.1 Framework & Methodology

To assess the performance of the proposed design, developed was a simulation framework from scratch consisting of two main components as shown in FIG. 7. First, for coarse-grained computation, at the circuit level, we fully implemented PISA with peripheral circuitry with TSMC 65 nm-GP in Cadence to achieve the performance parameters. For the NVM elements, we jointly use the NEGF and LLG equations to model MTJ [28']. A Verilog-A model of the NVM element is then developed to co-simulate with interface CMOS circuits in Cadence Spectre and SPICE. PISA requires binarizing the 1st-layer weights as discussed while the rest of the layers processed with the PNS unit have various bit-lengths. Trained was a PyTorch BWNN model inspired by [33'], [34'] extracting the 1st-layer weights. PISA's NVM elements are then programmed at the circuit-level by the binary weights. After 1st-layer computation, the results are recorded and fed into a behavioral-level PIM simulator to simulate the PNS platform. Second, for fine-grained computation, at the circuit level, fully implemented was a DRISA-ITIC [11'] and ReDRAM [32'] with TSMC 65 nm-GP in Cadence to achieve the performance parameters.

A custom architecture-level PIM support tool is developed based on previous simulation (PIMA-SIM [35']) to model the timing, energy, and area based on the circuit-level data. This tool offers the same flexibility in memory configuration regarding bank/mat/subarray organization and peripheral circuitry design as Cacti [36'] while supporting PIM-level configurations. Based on the circuit level results, it can alter the configuration files (.cfg) with different array organizations and add-ons such as DPU and report performance for PIM operations. We then configure the PNS unit with 1024 rows and 256 columns, 4×4 mats per bank organized in an H-tree routing manner, and 16×16 banks in each memory group. The behavioral PIM model developed in Python then takes coarse-grained computation voltage results, 2nd-to-last layer trained weights, and the PIM architecture-level data and processes the BWNN. It calculates the latency and energy that the whole system spends executing the network.

5.2 Results

Functionality: FIG. 8 shows the post-layout transient simulation waveforms of a 4×4 PISA array with eight NVM units (v=8) storing binary weights with VClk, VRst, VPD, ICBL, and VOut signals. PISA executes global shutter in processing mode and conducts all computations in parallel. As shown, periodically, by pre-charging $V_{PD}$ to VDD, the computation takes place at every falling edge of the clock, i.e., about 100 µs. In this way, $I_{CBL}$ carries the summation current corresponding to $V_{PDS}$. As can be seen, when $I_{CBL}$ is positive (e.g., the case of 32 µA and 39 µA) meaning the MAC result is larger than zero and the output sign function results in "1" and vice-versa.

Robustness: PISA operates in the mixed-signal domain, which is vulnerable to non-ideal factors, such as variations, noises, and leakage. We simulated the PISA's circuit-level variations and noises with equivalent post-layout parasitic at 300K with 10000 Monte-Carlo runs. This includes a variation in width/length of transistors and CBL capacitance. The impact of thermal noises was modeled as the additive Gaussian noise on the dynamic capacitance along with 1/f noise of CMOS transistors from the source-follower in pixels. The present study shows that the percentage of failure upon a considerable variation/noise (10%) across 10000 iterations is 0% as plotted $V_{PD}$ in FIG. 8.

The T4's and T5's gate capacitors as well as parasitic capacitors will be fully charged to VDD through T1 in the pre-charge cycle, this will significantly keep the pixel sensitivity when the number of compute add-ons increases. For variations above 10%, a noise-aware training technique is used injecting multiplicative noise onto the weights in the training to increase BWNN robustness. For the NVM element, it was added a resistance=2% variation to the Resistance-Area product, and a resistance=5% process variation (typical MTJ conductance variation [28']) on the TMR and verified a sense margin of 70 mV between parallel and anti-parallel cases.

Energy & Performance: Analyzed was the PISA's utility in processing the 1st-convolutional layer for continuous mobile vision in three scenarios, i.e., assisting mobile CPU (PISA-CPU), assisting mobile GPU (PISA-GPU), and PISAPNS, and comparing it with a baseline sensor-CPU platform. For this goal, a BWNN model with 6 binary-weight convolutional layers and 2 FC layers to process the SVHN dataset is adopted. The energy consumption and latency results of the under-test platforms are then reported for four various weight/input configurations in PNS (W:I=1: 32, 1:16, 1:8, 1:4) in FIG. 9. The under-test platforms in each experiment from left to right include the baseline design consisting of a conventional 128×128 image sensor and an Intel® Core i7-6700 at 3.4 GHz CPU with 16 GB RAM where the CPU plays the main role in processing all layers after receiving the raw data from the sensor's ADC. The second platform consists of the same CPU connected to 128×128 PISA array, where PISA processes 1st convolutional layer, and the remaining layers are processed by the CPU. The third design replaces the previous CPU with an NVIDIA GTX 1080Ti Pascal GPU with 3584 CUDA cores running at 1.5 GHZ (11 TFLOPS peak performance). For CPU/GPU platforms, used was the open source algorithm DoReFa-Net [3'] where the rest of the layers can be accelerated using the bit-wise convolution of fixed-point integers. The last two designs (fourth and fifth columns in each configuration in FIG. 9) take advantage of PISA and its PNS support to process the whole BWNN. When the 1st convolutional layer is processed by the PISA, we adopted two alternative PIM techniques, i.e., DRISA [11'] and ReDRAM [32'] in PNS unit to compute the 2nd-6th convolutional and 2 FC layers near the sensor. Note that, any bit-wise PIM techniques could be adopted. Reported herein was the breakdown of energy consumption into sensor processing, off-chip processing, data transfer, and PNS. It was found herein that PISA performs favorably against conventional CMOS image sensors. First, PISA substantially reduces the data transmission energy by at least 84%, paired with the CPU and GPU. The PISA-CPU platform saves 58% energy on average compared with the baseline as shown in FIG. 9(a).

While the PISAGPU does not show a remarkable energy-saving over PISACPU but is still 89% more energy-efficient than the baseline. Besides reduction in data transfer, the other reason behind such a striking energy saving is eliminating energy-hungry ADC units in PISA's processing mode. Second, it was observed that PISA-PNSs (PNS-I and PNS-II denote the adopted DRISA-1T1C and ReDRAM techniques, respectively) reduce the energy consumption of edge devices dramatically. The PISA-PNS-II requires about a 50-170 µJ energy depending on the PNS configuration to process the whole BWNN on the edge, which is a safe choice for power-constrained IoT sensor devices. The PISA-PNS designs almost eliminate the data transmission energy. FIG. 9(b) illustrates the execution time corresponding to various W:I configurations. It was observed herein that the PISA-PNS designs achieve about a 9-11× speed-up in processing input frames compared with the baseline.

Resource Utilization: To explore the impact of PISA in reducing memory bottleneck in executing the 1st layer of BWNN, measured was the time fraction at which on-/off chip data transfer limits the performance. This evaluation was accomplished through experimentally extracted results of each platform with the number of memory access. Observed was the PISA spends less than 5% of the time for data conversion and memory access, whereas the baseline design spends over 76% of its time waiting to load data from memory. The PISA-PNS platforms obtain the highest ratio utilizing up to 95% computation resources.

Comparison: Table 2 in FIG. 12 compares the structural and performance parameters of selective PIS designs in the literature. As different designs are developed for specific domains, for an impartial comparison, estimated and normalized was the power consumption when all PIS units execute the similar task of processing the 1st-layer of DNN. The PISA achieves a frame rate of 1000 and an efficiency of about 1.745 TOp/s/W as the most efficient design. This comes from the massively parallel CFP and eliminating ADC for coarse-grained detection. However, the design in the previous a study [8'] achieves the highest framerate and the design in [2'] imposes the least pixel size enabling in-sensor computing. As for the area, the present simulation results reported in Table 2 show a PISA's compute-pixel occupies about 55×55 µm2 in 65 nm. It was believed that a ballpark assessment could be made by comparing the number of minimum-size transistors in previous SRAM-based designs and PISA's lower-overhead compute add-on. Reimplemented was MACSen [9'] at the circuit-level as the only BWNN accelerator developed with the same purpose. The present evaluation showed that with the same PNS unit based on DRISA [11'], PISA consumes about 40% less power consumption. Putting everything together, PISA offers 1) a low-overhead, dual-mode and reconfigurable design to keep the sensing performance and realize a processing mode to remarkably reduce the power consumption of data conversion and transmission; 2) single-cycle in-sensor processing mechanism to improve image processing speed; 3) highly parallel in-sensor processing design to achieve ultrahigh-throughput; 4) exploiting NVM which reduces standby power consumption during idle time and offers instant wake-up time, and resilience to power failure to achieve high performance.

While Table 2 focuses on various PIS architectures (close-to-pixel computation) mostly supporting DNNs in the binary domain, there are recent architectures that show a systolic neural CPU fusing the operation of a traditional CPU and a systolic CNN accelerator [38']. Such designs can be efficiently leveraged as a PNS unit to process the entire DNNs.

Compared with the present work described herein, the design in previous studies [38'] shows a systolic neural CPU fusing the operation of a traditional CPU and a systolic CNN accelerator. It converts 10 CPU cores into an 8-bit systolic CNN accelerator showing higher performance (1.82 TOPS/W @65 nm vs. 1.74 TOPS/W @65 nm in PISA) and also provides higher flexibility and bit-width (up to 8-bit). However, it does not support in-sensor computation and has to rely on the costly raw data from the pixel array. Another recent 65 nm CNN accelerator has been demonstrated in [39'] that replaces the commonly used SRAM cell with a 3-transistor memory cell to represent 4-bit/8-bit weight values as an analog voltage.

Accuracy: In the original BWNN topology, all the layers, except the first and last, are implemented with binarized weights [31'], [40'], [41']. Since, in image classification tasks, the number of input channels is relatively smaller than the number of internal layers' channels, the required parameters and computations are small. Thus, converting the input layer will not be a significant issue [31'].

Conducted were experiments on several datasets, including MNIST, SVHN, and CIFAR-10. FIG. 10 shows the validation error versus the number of epochs of three different datasets in a worst-case scenario, i.e., with a 1:4 configuration for 2nd to the last layer. The comparison of classification accuracy is summarized in Table 3 in FIG. 13. It was found that the PISA shows an acceptable accuracy while providing significant energy-delay-product reduction as discussed earlier.

6. POSSIBLE ALTERNATIVES

Although almost all the state-of-the-art image sensor designs utilize effective methods to reduce dynamic energy consumption, including clock gating and low-voltage operation, an increasing number of modern intelligent sensors and more application scenarios, making the standby power dissipation of such systems a critical issue, which can limit the wider sensors' applications. The emergence of energy harvesting systems as a promising approach for battery-less IoTs suffers from intermittent behavior, leading to data and environmental inconsistencies. For example, captured data by sensors become unstable if they are held for a long time without intermittent resilient architectures and/or harvestable sources.

Moreover, since concurrency with sensors is relatively interrupt-driven, intermittency makes this concurrency control much more complex. To solve the data consistency, PISA utilizes NVM elements, which reduce standby power consumption during idle time, instant wakeup time, and resilience to power failure, leading to high throughput and high performance at the cost of minor accuracy degradation. It is within the scope of this disclosure to extend the principles discussed herein into image sensors' challenges in the presence of power failure for energy-harvested systems, and more thoroughly discuss PISA's power failure resiliency.

7. CONCLUSION

In summary, disclosed is an efficient processing in-sensor accelerator, namely PISA, for real-time edge-AI devices. PISA intrinsically performs a coarse-grained convolution operation on the 1st-layer of binarized-weight neural networks leveraging a novel compute-pixel with nonvolatile weight storage. The design was then completed by a near sensor processing-in-memory unit to perform a fine-grained convolution operation over the remaining layers. The results demonstrate acceptable accuracy on various data sets, while PISA achieves a frame rate of 1000 and an efficiency of about 1.74 TOp/s/W.

Any headings and sub-headings utilized in this description are not meant to limit the embodiments described thereunder. Features of various embodiments described herein may be utilized with other embodiments even if not described under a specific heading for that embodiment.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

REFERENCES

[1] T. Yamazaki, H. Katayama, S. Uehara, A. Nose, M. Kobayashi, S. Shida, M. Odahara, K. Takamiya, Y. Hisamatsu, S. Matsumoto, L. Miyashita, Y. Watanabe, T. Izawa, Y. Muramatsu, and M. Ishikawa, "4.9 a 1ms high-speed vision chip with 3d-stacked 140 gops column-parallel pes for spatio-temporal image processing," in 2017 IEEE International Solid-State Circuits Conference (ISSCC). IEEE, 2017, pp. 82-83.

[2] T.-H. Hsu, Y.-R. Chen, R.-S. Liu, C.-C. Lo, K.-T. Tang, M.-F. Chang, and C.-C. Hsieh, "A 0.5-v real-time computational cmos image sensor with programmable kernel for feature extraction," IEEE Journal of Solid-State Circuits, vol. 56, no. 5, pp. 1588-1596, 2020.

[3] P. Bhowmik, M. J. H. Pantho, and C. Bobda, "Event-based re-configurable hierarchical processors for smart image sensors," in 2019 IEEE 30th International Conference on Application-specific Systems, Architectures and Processors (ASAP), vol. 2160. IEEE, 2019, pp. 115-122.

[4] K. Bong, S. Choi, C. Kim, D. Han, and H.-J. Yoo, "A low-power convolutional neural network face recognition processor and a cis integrated with always-on face detector," IEEE Journal of Solid-State Circuits, vol. 53, no. 1, pp. 115-123, 2017.

[5] P. Bhowmik, M. J. H. Pantho, and C. Bobda, "Visual cortex inspired pixel-level re-configurable processors for smart image sensors," in 2019 56th ACM/IEEE Design Automation Conference (DAC). IEEE, 2019, pp. 1-2.

[6] H. Xu, Z. Li, N. Lin, Q. Wei, F. Qiao, X. Yin, and H. Yang, "Macsen: A processing-in-sensor architecture integrating mac operations into image sensor for ultra-low-power bnn-based intelligent visual perception," IEEE Transactions on Circuits and Systems II: Express Briefs, vol. 68, no. 2, pp. 627-631, 2020.

[7] H. Xu, N. Lin, L. Luo, Q. Wei, R. Wang, C. Zhuo, X. Yin, F. Qiao, and H. Yang, "Senputing: An ultra-low-power always-on vision perception chip featuring the deep fusion of sensing and computing," IEEE Transactions on Circuits and Systems I: Regular Papers, 2021.

[8] S. Park, J. Cho, K. Lee, and E. Yoon, "7.2 243.3 pj/pixel bio-inspired time-stamp-based 2d optic flow sensor for artificial compound eyes," in 2014 IEEE International Solid-State Circuits Conference Digest of Technical Papers (ISSCC). IEEE, 2014, pp. 126-127.

[9] Z. Li, H. Xu, L. Luo, Q. Wei, and F. Qiao, "A 5.9 μw ultra-low-power dual-resolution cis chip of sensing-with-computing for always-on intelligent visual devices," in 2021 IEEE International Symposium on Circuits and Systems (ISCAS). IEEE, 2021, pp. 1-5.

[10] H. Xu, M. Nazhamaiti, Y. Liu, F. Qiao, Q. Wei, X. Liu, and H. Yang, "Utilizing direct photocurrent computation and 2d kernel scheduling to improve in-sensor-processing efficiency," in 2020 57th ACM/IEEE Design Automation Conference (DAC). IEEE, 2020, pp. 1-6.

[11] X. Zhong, Q. Yu, A. Bermak, C.-Y. Tsui, and M.-K. Law, "A 2pj/pixel/direction mimo processing based cmos image sensor for omnidirectional local binary pattern extraction and edge detection," in 2018 IEEE Symposium on VLSI Circuits. IEEE, 2018, pp. 247-248.

[12] W.-T. Kim, H. Lee, J.-G. Kim, and B.-G. Lee, "An on-chip binary-weight convolution cmos image sensor for neural networks," IEEE Transactions on Industrial Electronics, vol. 68, no. 8, pp. 7567-7576, 2020.

[13] R. LiKamWa, Y. Hou, J. Gao, M. Polansky, and L. Zhong, "Redeye: analog convnet image sensor architecture for continuous mobile vision," ACM SIGARCH Computer Architecture News, vol. 44, no. 3, pp. 255-266, 2016.

[14] J. Choi, S. Park, J. Cho, and E. Yoon, "An energy/illumination-adaptive cmos image sensor with reconfigurable modes of operations," IEEE Journal of Solid-State Circuits, vol. 50, no. 6, pp. 1438-1450, 2015.

[1'] T.-H. Hsu, Y.-C. Chiu, W.-C. Wei, Y.-C. Lo, C.-C. Lo, R.-S. Liu, K.-T. Tang, M.-F. Chang, and C.-C. Hsieh, "Ai edge devices using computing-in-memory and processing-in-sensor: from system to device," in 2019 IEEE International Electron Devices Meeting (IEDM). IEEE, 2019, pp. 22-5.

[2'] T. Yamazaki, H. Katayama, S. Uehara, A. Nose, M. Kobayashi, S. Shida, M. Odahara, K. Takamiya, Y. Hisamatsu, S. Matsumoto, L. Miyashita, Y. Watanabe, T. Izawa, Y. Muramatsu, and M. Ishikawa, "4.9 a 1 ms high-speed vision chip with 3d stacked 140 gops column-parallel pes for spatio-temporal image processing," in 2017 IEEE International Solid-State Circuits Conference (ISSCC). IEEE, 2017, pp. 82-83.

[3'] S. Zhou, Y. Wu, Z. Ni, X. Zhou, H. Wen, and Y. Zou, "Dorefa-net: Training low bitwidth convolutional neural networks with low bitwidth gradients," arXiv preprint arXiv: 1606.06160, 2016.

[4'] M. Rastegari, V. Ordonez, J. Redmon, and A. Farhadi, "Xnornet: Imagenet classification using binary convolutional neural networks," in European conference on computer vision. Springer, 2016, pp. 525-542.

[5'] M. Courbariaux, I. Hubara, D. Soudry, R. El-Yaniv, and Y. Bengio, "Binarized neural networks: Training deep neural networks with weights and activations constrained to +1 or −1," arXiv preprint arXiv: 1602.02830, 2016.

[6'] S. Angizi, Z. He, A. S. Rakin, and D. Fan, "Cmp-pim: an energy efficient comparator-based processing-in-memory neural network accelerator," in Proceedings of the 55th Annual Design Automation Conference. ACM, 2018, p. 105.

[7'] L. Song, X. Qian, H. Li, and Y. Chen, "Pipelayer: A pipelined reram-based accelerator for deep learning," in High Performance Computer Architecture (HPCA), 2017 IEEE International Symposium on. IEEE, 2017, pp. 541-552.

[8'] S. J. Carey, A. Lopich, D. R. Barr, B. Wang, and P. Dudek, "A 100,000 fps vision sensor with embedded 535 gops/w 256_ 256 simd processor array," in 2013 Symposium on VLSI Circuits. IEEE, 2013, pp. C182-C183.

[9'] H. Xu, Z. Li, N. Lin, Q. Wei, F. Qiao, X. Yin, and H. Yang, "Macsen: A processing-in-sensor architecture integrating mac operations into image sensor for ultra-low-power bnn-based intelligent visual perception," IEEE Transactions on Circuits and Systems II: Express Briefs, vol. 68, no. 2, pp. 627-631, 2020.

[10'] T.-H. Hsu, Y.-R. Chen, R.-S. Liu, C.-C. Lo, K.-T. Tang, M.-F. Chang, and C.-C. Hsieh, "A 0.5-v real-time computational cmos image sensor with programmable kernel for feature extraction," IEEE Journal of Solid-State Circuits, vol. 56, no. 5, pp. 1588-1596, 2020.

[11'] S. Li, D. Niu, K. T. Malladi, H. Zheng, B. Brennan, and Y. Xie, "Drisa: A dram-based reconfigurable in-situ accelerator," in Proceedings of the 50th Annual IEEE/ACM International Symposium on Microarchitecture. ACM, 2017, pp. 288-301.

[12'] S. Angizi, Z. He, D. Reis, X. S. Hu, W. Tsai, S. J. Lin, and D. Fan, "Accelerating deep neural networks in processing-in memory platforms: Analog or digital approach?" in 2019 IEEE Computer Society Annual Symposium on VLSI (ISVLSI). IEEE, 2019, pp. 197-202.

[13'] H. Xu, N. Lin, L. Luo, Q. Wei, R. Wang, C. Zhuo, X. Yin, F. Qiao, and H. Yang, "Senputing: An ultra-low-power always-on vision perception chip featuring the deep fusion of sensing and computing," IEEE Transactions on Circuits and Systems I: Regular Papers, 2021.

[14'] K. Bong, S. Choi, C. Kim, S. Kang, Y. Kim, and H.-J. Yoo, "14.6 a 0.62 mw ultra-low-power convolutional-neural-network face recognition processor and a cis integrated with always-on haar like face detector," in 2017 IEEE International Solid-State Circuits Conference (ISSCC). IEEE, 2017, pp. 248-249.

[15'] X. Zhong, Q. Yu, A. Bermak, C.-Y. Tsui, and M.-K. Law, "A 2pj/pixel/direction mimo processing based cmos image sensor for omnidirectional local binary pattern extraction and edge detection," in 2018 IEEE Symposium on VLSI Circuits. IEEE, 2018, pp. 247-248.

[16'] H. Xu, Z. Liu, Z. Li, E. Ren, M. Nazhamati, F. Qiao, L. Luo, Q. Wei, X. Liu, and H. Yang, "A 4.57_w@ 120 fps vision system of sensing with computing for bnn-based perception applications," in 2021 IEEE Asian Solid-State Circuits Conference (A-SSCC). IEEE, 2021, pp. 1-3.

[17'] W.-T. Kim, H. Lee, J.-G. Kim, and B.-G. Lee, "An on-chip binary weight convolution cmos image sensor for neural networks," IEEE Transactions on Industrial Electronics, vol. 68, no. 8, pp. 7567-7576, 2020.

[18'] R. LiKamWa, Y. Hou, J. Gao, M. Polansky, and L. Zhong, "Redeye: analog convnet image sensor architecture for continuous mobile vision," ACM SIGARCH Computer Architecture News, vol. 44, no. 3, pp. 255-266, 2016.

[19'] F. Taherian and D. Asemani, "Design and implementation of digital image processing techniques in pulse-domain," in 2010 IEEE Asia Pacific Conference on Circuits and Systems. IEEE, 2010, pp. 895-898.

[20'] W. J. Gallagher and S. S. Parkin, "Development of the magnetic tunnel junction mram at ibm: From first junctions to a 16-mb mram demonstrator chip," IBM Journal of Research and Development, vol. 50, no. 1, pp. 5-23, 2006.

[21'] "Everspin announces sampling of the world's first 1-gigabit mram product. 2016." [Online]. Available: https://www.everspin.com

[22'] W. Kang, Y. Ran, Y. Zhang, W. Lv, and W. Zhao, "Modeling and exploration of the voltage-controlled magnetic anisotropy effect for the next-generation low-power and high-speed mram applications," IEEE Transactions on Nanotechnology, vol. 16, no. 3, pp. 387-395, 2017.

[23'] S. Fukami, T. Anekawa, C. Zhang, and H. Ohno, "A spin-orbit torque switching scheme with collinear magnetic easy axis and current configuration," Nature nanotechnology, 2016.

[24'] G. E. Rowlands, T. Rahman, J. A. Katine, J. Langer, A. Lyle, H. Zhao, J. G. Alzate, A. A. Kovalev, Y. Tserkovnyak, Z. M. Zeng, H. W. Jiang, K. Galatsis, Y. M. Huai, P. K. Amiri, K. L. Wang, I. N. Krivorotov, and J.-P. Wang, "Deep subnanosecond spin torque switching in magnetic tunnel junctions with combined in-plane and perpendicular polarizers," Applied Physics Letters, vol. 98, no. 10, p. 102509, 2011.

[25'] J. J. Kan, C. Park, C. Ching, J. Ahn, L. Xue, R. Wang, A. Kontos, S. Liang, M. Bangar, H. Chen, S. Hassan, S. Kim, M. Pakala, and S. H. Kang, "Systematic validation of 2×nm diameter perpendicular mtj arrays and mgo barrier for sub-10 nm embedded stt-mram with practically unlimited endurance," in Electron Devices Meeting (IEDM), 2016 IEEE International. IEEE, 2016, pp. 27-4.

[26'] T. Kawahara, "Challenges toward gigabit-scale spin-transfer torque random access memory and beyond for normally off, green information technology infrastructure," Journal of Applied Physics, vol. 109, no. 7, p. 07D325, 2011.

[27'] M. D. Stiles and A. Zangwill, "Anatomy of spin-transfer torque," Physical Review B, vol. 66, no. 1, p. 014407, 2002.

[28'] X. Fong, S. K. Gupta, N. N. Mojumder, S. H. Choday, C. Augustine, and K. Roy, "Knack: A hybrid spin-charge mixed-mode simulator for evaluating different genres of spin-transfer torque mram bitcells," in 2011 International Conference on Simulation of Semiconductor Processes and Devices, 2011, pp. 51-54.

[29'] G. Panagopoulos, C. Augustine, and K. Roy, "A framework for simulating hybrid mtj/cmos circuits: Atoms to system approach," in 2012 Design, Automation & Test in Europe Conference & Exhibition (DATE). IEEE, 2012, pp. 1443-1446.

[30'] M. Courbariaux, Y. Bengio, and J.-P. David, "Binary connect: Training deep neural networks with binary weights during propagations," arXiv preprint arXiv: 1511.00363, 2015.

[31'] I. Hubara, M. Courbariaux, D. Soudry, R. El-Yaniv, and Y. Bengio, "Binarized neural networks," Advances in neural information processing systems, vol. 29, 2016.

[32'] S. Angizi and D. Fan, "Redram: A reconfigurable processing in-dram platform for accelerating bulk bit-wise operations," in 2019 IEEE/ACM International Conference on Computer-Aided Design (ICCAD). IEEE, 2019, pp. 1-8.

[33'] P. Guo, H. Ma, R. Chen, P. Li, S. Xie, and D. Wang, "Fbna: A fully binarized neural network accelerator," in 2018 28th International Conference on Field Programmable Logic and Applications (FPL). IEEE, 2018, pp. 51-513.

[34'] W. Tang, G. Hua, and L. Wang, "How to train a compact binary neural network with high accuracy?" in Thirty-First AAAI conference on artificial intelligence, 2017.

[35'] S. Angizi, N. Khoshavi, A. Marshall, P. Dowben, and D. Fan, "Mefram: A new non-volatile cache memory based on magneto-electric fet," ACM Transactions on Design Automation of Electronic Systems (TODAES), vol. 27, no. 2, pp. 1-18, 2021.

[36'] S. Thoziyoor, N. Muralimanohar, J. H. Ahn, and N. P. Jouppi, "Cacti 5.1," Technical Report HPL-2008-20, HP Labs, Tech. Rep., 2008.

[37'] S. Park, J. Cho, K. Lee, and E. Yoon, "7.2 243.3 pj/pixel bio-inspired time-stamp-based 2d optic flow sensor for artificial compound eyes," in 2014 IEEE International Solid-State Circuits Conference Digest of Technical Papers (ISSCC). IEEE, 2014, pp. 126-127.

[38'] Y. Ju and J. Gu, "A 65 nm systolic neural cpu processor for combined deep learning and general-purpose computing with 95% pe utilization, high data locality and enhanced end-to-end performance," in 2022 IEEE International Solid-State Circuits Conference (ISSCC), vol. 65. IEEE, 2022, pp. 1-3.

[39'] Z. Chen, X. Chen, and J. Gu, "15.3 a 65 nm 3t dynamic analog ram-based computing-in-memory macro and cnn accelerator with retention enhancement, adaptive analog sparsity and 44 tops/w system energy efficiency," in 2021 IEEE International Solid-State Circuits Conference (ISSCC), vol. 64. IEEE, 2021, pp. 240-242.

[40'] M. Ghasemzadeh, M. Samragh, and F. Koushanfar, "Rebnet: Residual binarized neural network," in 2018

IEEE 26th Annual International Symposium on Field-Programmable Custom Computing Machines (FCCM). IEEE, 2018, pp. 57-64.

[41'] Y. Umuroglu, N. J. Fraser, G. Gambardella, M. Blott, P. Leong, M. Jahre, and K. Vissers, "Finn: A framework for fast, scalable binarized neural network inference," in Proceedings of the 2017 ACM/SIGDA international symposium on field-programmable gate arrays, 2017, pp. 65-74.

What is claimed is:

1. A method for a Processing-In-Sensor architecture (PISA), comprising:

inputting data that represents an image into an edge Internet-of-Things (IoT) device;

enabling integrated sensing and processing of a $1^{st}$ layer of a Binarized-Weight Neural Networks (BWNN) with weights stored in a non-volatile magnetic memory component for offering energy-efficiency and speed-up at the edge IoT device; and implementing a convolutional operation, wherein the convolutional operation includes implementing a coarse-grained convolution operation in the Binarized-Weight Neural Networks (BWNN) through leveraging a compute-pixel with a non-volatile weight storage at a sensor side.

2. The method of claim 1, further comprises reducing power consumption of data conversion and transmission to an off-chip processor.

3. The method of claim 1, further comprises processing network layers with a bit-wise near-sensor in memory computing unit or a near-sensor processing unit.

4. The method of claim 3, further comprises detecting an object and switching to a sensing mode to capture an image for a fine-grained convolution using only the near-sensor processing unit.

5. A processing-in-sensor architecture (PISA) system comprising:

a network structure with at least four convolutional layers and one Fully Connected (FC) layer with an image input data being processed therein;

a non-volatile memory (NVM) element for pre-storing a plurality of pixels from the image input data;

wherein, the four convolutional layers include a $1^{st}$-layer, a $2^{nd}$ layer, a $3^{rd}$ layer and a $4^{th}$ layer, and the 1st-layer is processed in a Binarized-Weight Neural Network (BWNN); and a Process Near Sensor (PNS) unit to perform a low bit-width coarse-grained convolution on the remaining $2^{nd}$ layer, $3^{rd}$ layer and $4^{th}$ layer.

6. The system of claim 5, further comprises a binarized weight included in the $1^{st}$ layer corresponding to the pixels pre-stored into the NVM, and a coarse-grained multiply-and-accumulate (MAC) operation accomplished in a voltage-controlled crossbar process.

7. The system of claim 6, wherein an output of the 1st layer is transmitted to the PNS unit for computation of the $2^{nd}$ layer, the $3^{rd}$ layer, and the 4th layer.

8. The system of claim 5, further comprising a switch for switching to a sensing mode once an object is roughly detected.

9. The system of claim 8, wherein the PNS unit provides a fine-grained convolution after capture of an image of the object.

10. The system of claim 9, further comprises a sense bit-line (SBL) that is shared across pixels on a same column connected to a sensor for the sensing mode.

11. The system of claim 5, further comprising a Compute Focal Plane (CFP), a row and column controllers (Ctrl), a command decoder, a sensor timing control, and a sensor I/O that operates in two modes.

12. The system of claim 11, wherein, the CFP is cointegrated for sensing and processing the $1^{st}$ layer of the BWNN targeting a low-power and coarse grained classification.

13. The system of claim 11, further comprising a Compute Pixel (CP) unit that includes a pixel connected to the Non-Volatile Memory (NVM) element.

14. A method for a Processing-In-Sensor architecture (PISA), comprises:

performing an image processing method of an object by processing an image through a $1^{st}$ convolution layer in a Binarized-Weight Neural Networks (BWNN) for implementing a coarse grained convolution operation;

performing a low bit-width coarse-grained convolution in a Processor Near Sensor (PNS) unit on a plurality of other convolution layers;

switching a Processing-In-Sensor architecture (PISA) to a sensing mode to capture the image when the object is roughly detected after the low bit-width coarse-grained convolution; and using on the image a fine-grained convolution using the PNS unit.

15. The method of claim 14 further includes using the image processing method for real-time and smart image processing in an artificial intelligence (AI) device.

16. The method of claim 14, wherein the PISA intrinsically performs a coarse-grained convolution operation on the 1st-layer of the BWNN leveraging a compute-pixel with a nonvolatile weight storage.

17. The method of claim 14, further includes performing the fine-grained convolution operation though the PNS on the plurality of other layers.

18. The method of claim 14, further includes achieving by the PISA a frame rate of 1000 and an efficiency of about 1.74 TOp/s/W.

19. The method of claim 14 wherein the PNS is an off-chip processor that reduces power consumption of data conversion and transmission as compared to not using the PNS.

* * * * *